US010550286B2

(12) United States Patent
West

(10) Patent No.: US 10,550,286 B2
(45) Date of Patent: Feb. 4, 2020

(54) AEROSOL SILICONE

(71) Applicant: Richard A. West, Lakewood, OH (US)

(72) Inventor: Richard A. West, Lakewood, OH (US)

( * ) Notice: Subject to any disclaimer, the term of this patent is extended or adjusted under 35 U.S.C. 154(b) by 0 days.

(21) Appl. No.: 15/847,423

(22) Filed: Dec. 19, 2017

(65) Prior Publication Data

US 2018/0215947 A1 Aug. 2, 2018

Related U.S. Application Data

(60) Provisional application No. 62/436,874, filed on Dec. 20, 2016, provisional application No. 62/465,873, filed on Mar. 2, 2017, provisional application No. 62/579,259, filed on Oct. 31, 2017.

(51) Int. Cl.

| | |
|---|---|
| ***C09D 183/04*** | (2006.01) |
| ***C09D 7/40*** | (2018.01) |
| ***C09D 7/61*** | (2018.01) |
| ***C09K 3/30*** | (2006.01) |
| ***C08J 9/14*** | (2006.01) |
| ***B65D 83/14*** | (2006.01) |
| ***C08J 9/00*** | (2006.01) |
| *C08K 3/22* | (2006.01) |
| *C08K 3/36* | (2006.01) |

(52) U.S. Cl.

CPC ......... *C09D 183/04* (2013.01); *B65D 83/752* (2013.01); *C08J 9/0066* (2013.01); *C08J 9/146* (2013.01); *C09D 7/40* (2018.01); *C09D 7/61* (2018.01); *C09K 3/30* (2013.01); *C08J 2203/164* (2013.01); *C08J 2383/04* (2013.01); *C08K 3/36* (2013.01); *C08K 2003/2241* (2013.01)

(58) Field of Classification Search

CPC . C09D 183/06; C09D 7/61; C08J 9/12; C08K 5/5465

See application file for complete search history.

(56) References Cited

U.S. PATENT DOCUMENTS

| | | | | |
|---|---|---|---|---|
| 7,198,205 | B1 | 4/2007 | Solomon et al. | |
| 7,520,553 | B1 * | 4/2009 | Schouest ................. | B60R 13/01 296/39.1 |
| 2013/0260068 | A1 * | 10/2013 | Serobian .............. | C09D 183/04 428/35.7 |

OTHER PUBLICATIONS

A46 (http://www.diversifiedcpc.com/Stewardship/Documents/MSDS/012900_A-46.pdf)(date unknown).*

A70 (http://www.diversifiedcpc.com/Stewardship/Documents/MSDS/015400_A-70.pdf)(date unknown).*

* cited by examiner

*Primary Examiner* — Kuo Liang Peng

(74) *Attorney, Agent, or Firm* — Fay Sharpe LLP

(57) ABSTRACT

A silicone-based aerosol product includes a container and an aerosol silicone composition within the container. The aerosol silicone composition includes a silicone elastomer composition and a propellant.

23 Claims, 5 Drawing Sheets

AEROSOL SILICONE

The present application claims the priority benefit of U.S. Provisional Patent Application Ser. No. 62/436,874, filed Dec. 20, 2016; U.S. Provisional Patent Application Ser. No. 62/465,873, filed Mar. 2, 2017; and U.S. Provisional Patent Application Ser. No. 62/579,259, filed Oct. 31, 2017, the disclosures of which are incorporated herein by reference.

BACKGROUND

The present disclosure relates to a new aerosol silicone product, in particular, to a high performance silicone elastomeric coating.

The silicone composition can be used for a variety of applications including paints, sealing and weatherproofing windows, doors, ducts, vents, cracks, electrical box perimeters, plumbing chases, custom gaskets, etc. Moreover, the product can be used as a general purpose adhesive, can be used above and below grade, and can be used outdoors without the need for painting over. Of course, there are still other uses and applications.

Current compositions for similar applications are non-silicone such as urethane or latex based (organics). A need exists for a silicone-based aerosol product, the benefits and advantages of which will become apparent from reading and understanding the following detailed description.

The compositions of the present disclosure are designed to expand and contract after curing without permanent deformation. In other words, the compositions are elastomeric.

Another need relates to sealing the product in the container between uses. The silicone-based composition is a moisture cure so that it is imperative to limit moisture intrusion into the valve and actuator of the aerosol spray container.

BRIEF DESCRIPTION

Disclosed, in some embodiments, is a silicone-based aerosol product including: a container; and an aerosol silicone composition within the container. The aerosol silicone composition includes a silicone elastomer composition and a propellant.

In some embodiments, the silicone elastomer composition includes: 25 wt % to 70 wt % of a silanol functional fluid; 20 wt % to 42 wt % of a siloxane fluid; 0.001 wt % to 1 wt % of a catalyst; up to 45 wt % of at least one filler; up to 20 wt % of at least one crosslinking agent; and up to 3 wt % of an adhesion promoter.

In some embodiments, the at least one crosslinking agent is a mixture of methyltris(methylethylketoxime) silane and vinyl tris(methylethylketoxime) silane; and the silicone elastomer composition includes: 50 wt % to 62 wt % of the silanol functional fluid; 29 wt % to 35 wt % of the siloxane fluid, wherein the siloxane fluid is decamethylcyclopentasiloxane; 0.05 wt % to 0.20 wt % of the catalyst, wherein the catalyst is dimethyltin dineodecanoate; 2.75 wt % to 3.25 wt % of the at least one filler, wherein the at least one filler is fumed silica; 5 wt % to 7 wt % of the methyltris(methylethylketoxime) silane; 2 wt % to 3 wt % of the vinyl tris(methylethylketoxime) silane; and 0.2 wt % to 0.3 wt % of the adhesion promoter, wherein the adhesion promoter is bis(3-triethoxysilyl (propyl) amine).

In some embodiments, the at least one crosslinking agent is a mixture of methyltris(methylethylketoxime) silane and vinyl tris(methylethylketoxime) silane; the at least one filler is a mixture of fumed silica, a pigment filler, and a nepheline syenite-derived filler; and the silicone elastomer composition includes: 35 wt % to 45 wt % of the silanol functional fluid; wt % to 33 wt % of the siloxane fluid, wherein the siloxane fluid is decamethylcyclopentasiloxane; 0.04 wt % to 0.10 wt % of the catalyst, wherein the catalyst is dimethyltin dineodecanoate; 3.5 wt % to 4.5 wt % of the fumed silica; 5 wt % to 7 wt % of the pigment filler; 10 wt % to and 14 wt % of the nepheline syenite-derived filler; 3.5 wt % to 5.5 wt % of the methyltris(methylethylketoxime) silane; 1.5 wt % to 2.5 wt % of the vinyl tris(methylethylketoxime) silane; and 0.75 wt % to 1.25 wt % of the adhesion promoter, wherein the adhesion promoter is bis(3-triethoxysilyl (propyl) amine).

The pigment filler may be titanium dioxide.

In some embodiments, the at least one crosslinking agent is a mixture of methyltris(methylethylketoxime) silane and vinyl tris(methylethylketoxime) silane; the at least one filler is a mixture of fumed silica, a pigment filler, and a nepheline syenite-derived filler; and the silicone elastomer composition includes: 35 wt % to 45 wt % of the silanol functional fluid; wt % to 33 wt % of the siloxane fluid, wherein the siloxane fluid is decamethylcyclopentasiloxane; 0.10 wt % to 0.20 wt % of the catalyst, wherein the catalyst is dimethyltin dineodecanoate; 3 wt % to 4 wt % of the fumed silica; 1 wt % to 3 wt % of the pigment filler; 10 wt % to 18 wt % of the nepheline syenite-derived filler; 3.5 wt % to 5.5 wt % of the methyltris(methylethylketoxime) silane; 1.5 wt % to 2.5 wt % of the vinyl tris(methylethylketoxime) silane; 0.75 wt % to 1.25 wt % of the adhesion promoter, wherein the adhesion promoter is bis(3-triethoxysilyl (propyl) amine).

In some embodiments, the pigment filler is a black pigment filler.

Optionally, the aerosol silicone composition further comprises an inert gas.

In some embodiments, the propellant includes a mixture of propane and butane. The mixture may include from about 23 wt % to about 29 wt % propane and from about 72 wt % to about 76 wt % butane.

Disclosed, in other embodiments, are the aerosol silicone compositions, the silicone elastomer compositions, methods of making the products, a solution to preventing moisture intrusion into the aerosol container to prevent undesired curing of the sililcone elastomer composition in the container, and methods of using the products.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
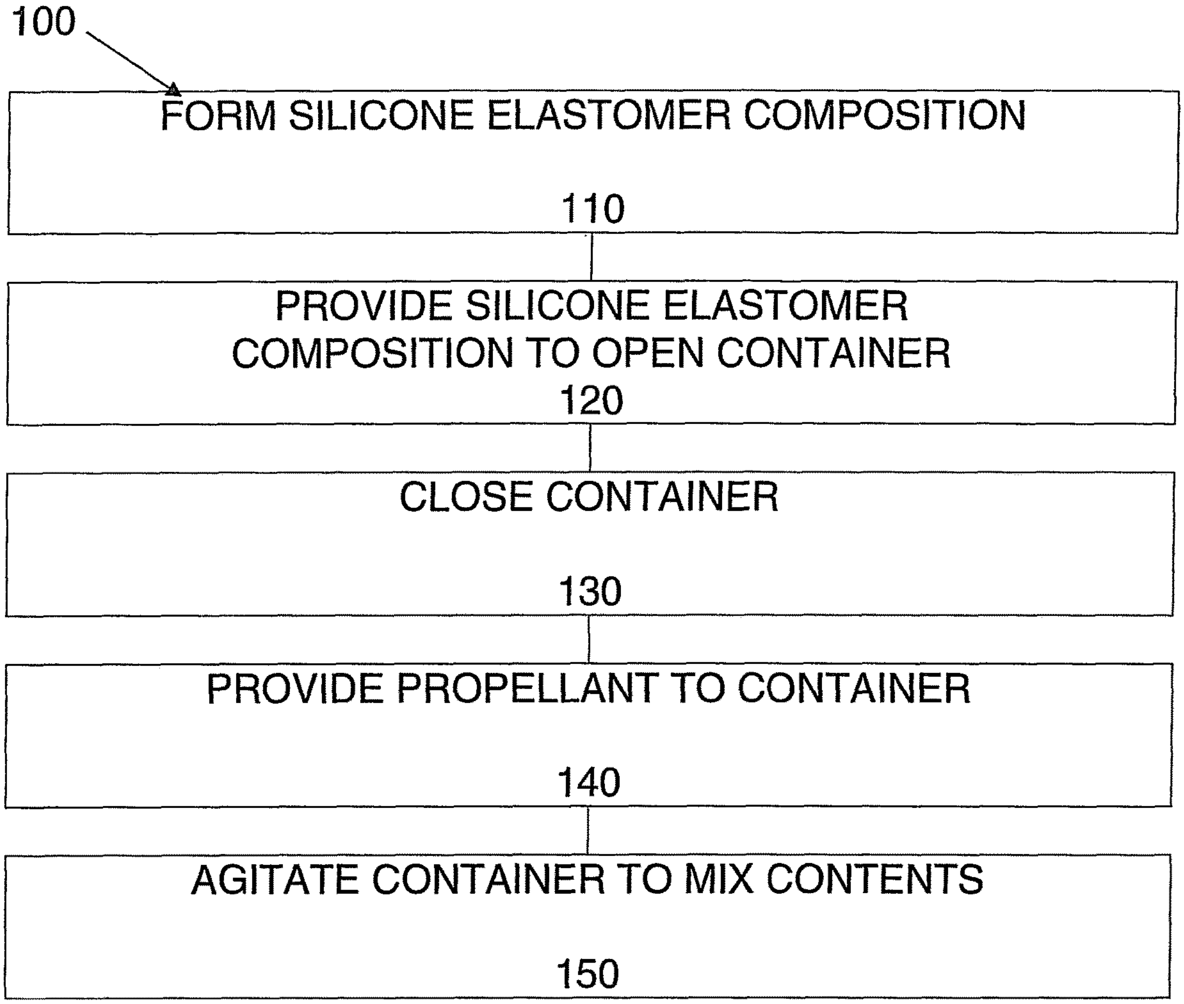
FIG. 1 is a flow chart illustrating a non-limiting example of a method for producing an aerosol silicone product in accordance with some embodiments of the present disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable.

The compositions of the present disclosure are designed to expand and contract after curing without permanent deformation. In other words, the compositions are elastomeric.

A silicone elastomer formulation is prepared, the silicone elastomer formulation is introduced into an open top container, the filled container is closed with a cap having a valve, a propellant is introduced into the closed container, the propellant (e.g., propane, propane/butane mix, or trans-1,3,3,3-tetrafluoropropene, also known as HFO-1234ze(E)) is intermixed with the silicone elastomer formulation in the closed container, and the silicone elastomer is selectively dispensed from the pressurized container through the valve.

The formulation may include one or more different reactive silicone polymers, one or more crosslinkers, one or more non-reactive silicone fluids, one or more catalysts, one or more adhesion promoters, one or more reinforcing fibers, one or more powdered fillers, one or more fire retardants, one or more colorants, and/or one or more surfactants.

The formulation is a RTV (room temperature vulcanized) silicone elastomer formulation.

The silicone composition may be dispensed from a pressurized can with a trigger/straw valve or through an actuator (spray tip) and sprayed. The propellant may be a gas (at room temperature and normal, ambient atmospheric pressure) and may liquefy when under a predetermined pressure.

The process of manufacturing the composition may include: mixing the silicone elastomer formulation utilizing high speed dispersion equipment; pouring the silicone elastomer mix into an open top container such as a metal container (12 ounce can and larger, for example); releasing a layer of an inert gas such as nitrogen gas into the open container/can to dispense room air; capping or closing the metal container/can with a valve; inject the propellant into the container/can through the valve; pressurizing the container/can with a propellant to an elevated pressure above ambient; and shaking the container/can to mix the liquefied propellant into the elastomer formulation.

The closed or sealed container/can then holds the intermixed liquefied propellant in the silicone elastomer formulation until a user or consumer desires to selectively dispense the silicone elastomer formulation by opening the valve via a valve actuator (actuating a trigger, handle, push button, or the like). By releasing the valve actuator and closing the valve, the remaining contents of the intermixed propellant/silicone elastomer formulation remain pressurized in the container/can until required.

Various aerosol silicone compositions are described in the tables below. The materials listed in these tables may be combined and/or mixed in various orders. In some embodiments, different portions of the same material are added add different stages of the mixing process. This may be done in order to control viscosity during the mixing, allow for a desired dispersion of filler materials, etc.

In some embodiments, the propellant is added after the other components have already been loaded into a container (e.g., after the other components have been mixed, added to a can, and the can has been capped with a valve).

The Table below summarizes one type of aerosol silicone composition in accordance with some embodiments of the present disclosure.

| Material Type | Non-Limiting Example | First wt % Range | Second wt % Range | Third wt % Range | Example wt % |
|---|---|---|---|---|---|
| Silicone Rubber (e.g., Silanol functional fluid) | Andisil ® OH750 (silanol terminated, viscosity = 750 cps.) | 20-50 | 20-40 | 24-30 | 27 |
| Fumed Silica | Aerosil ® R 8200 (hexamethyl-disilazane aftertreated fumed silica) | 0.5-10 | 1-7 | 3-5 | 4 |
| Filler and/or pigment | $TiO_2$ | 0-20 | 5-15 | 8-12 | 10 |
| Cross-linking Agent | MOS (methyltris (methylethyl-ketoxime) silane) | 1-10 | 1-5 | 2-3 | 2.4 |
| Cross-linking Agent | VOS (vinyl tris (methylethyl-ketoxime) silane) | 1-10 | 1-5 | 2-3 | 2.4 |

-continued

| Material Type | Non-Limiting Example | First wt % Range | Second wt % Range | Third wt % Range | Example wt % |
|---|---|---|---|---|---|
| Adhesion Promoter | Dynasylan ® 1122 (bis(3-triethoxysilyl (propyl) amine)) | 0-1 | 0.1-0.7 | 0.3-0.4 | 0.36 |
| Solvent (e.g., mineral spirits) | Calumet 360 | 5-30 | 10-25 | 16-20 | 18 |
| Propellant | Honeywell Solstice ® Gas Blowing Agent (trans-1,3,3,3-tetrafluoroprop-1-ene) | 25-50 | 30-40 | 33-38.5 | 35.7 |
| Catalyst | Andisil ® TL 28 (dimethyltin dineodecanoate) | 0.001-1 | 0.01-0.5 | 0.05-0.2 | 0.1 |

The Table below summarizes a second type of aerosol silicone composition in accordance with some embodiments of the present disclosure.

| Material Type | Non-Limiting Example | First wt % Range | Second wt % Range | Third wt % Range | Example wt % |
|---|---|---|---|---|---|
| Silicone Rubber (e.g., Silanol functional fluid) | Andisil ® OH750 (silanol terminated, viscosity = 750 cps.) | 20-50 | 20-40 | 27-33 | 30.3 |
| Fumed Silica | Aerosil ® R 8200 (hexamethyl-disilazane aftertreated fumed silica) | 1-10 | 3-9 | 4-8 | 6 |
| Cross-linking Agent | MOS (methyltris (methylethyl-ketoxime) silane) | 1-10 | 2-8 | 4-7 | 5.4 |
| Adhesion Promoter | Dynasylan ® 1122 (bis(3-triethoxysilyl (propyl) amine)) | 0-1 | 0.1-0.7 | 0.3-0.4 | 0.36 |
| Solvent (e.g., mineral spirits) | Calumet 360 | 5-30 | 10-25 | 16-20 | 22.1 |
| Propellant | Honeywell Solstice ® Gas Blowing Agent (trans-1,3,3,3-tetra-fluoroprop-1-ene) | 25-50 | 30-40 | 33-38.5 | 35.7 |
| Catalyst | Andisil ® TL 28 (dimethyltin dineodecanoate) | 0.001-1 | 0.01-0.5 | 0.05-0.2 | 0.1 |

Some of the features, advantages, and benefits of the aerosol silicone of the present disclosure include: graffiti resistant; available in colors and/or without colors; available in transparent, semi-transparent, and/or opaque; safe for food contact; excellent weathering characteristics; breathable membrane (high permeability); remains flexible in temperature extremes; thin-film waterproofing; tenacious adhesion; environmentally friendly; lower spray flammability; compatible with silicone sealants; mold/mildew resistant; balanced properties (tough, yet flexible); lower pressure application, better control; can be recoated at any time (no restrictions); will not age harden, crack, or chalk; 100% silicone; and easy cleanup.

The following Table describes some differences between a non-limiting example of a composition in accordance with some embodiments of the present disclosure and two comparative compositions.

| | Example 1 | Comparative Example 1 | Comparative Example 2 |
|---|---|---|---|
| Odor | mild solvent | strong solvent | very strong solvent |
| Spray Surface | matte | Fluffy | gloss-like paint |
| Spray Pattern | 2" | 2" | 2" |
| Elastomeric? | yes | No | no |
| Tack free (minutes) | 30 | 75 | 30 |
| Cure time (hours) | 8 | 48 | 24 |
| Coverage (sq. ft.) | 10 (@ 8 mils thickness) | 2-12 | N/A |
| Volative Organic Compounds (g/L) | <250 | not published | unknown |
| Solids (wt %; sprayed) | 37.5 | 30.6 | 19.9 |
| Veritcal hang (mils) | 8 | 8 | 8 |

Tensile strengths of Comparative Examples 1 and 2 when tested at 10° F. versus 68° F.

During elongation testing, film of Comparative Example 1 and Comparative Example 2 developed porosity prior to break.

The Table below summarizes a third type of aerosol silicone composition in accordance with some embodiments of the present disclosure.

| Material Type | Non-Limiting Example | First wt % Range | Second wt % Range | Third wt % Range | Example wt % |
|---|---|---|---|---|---|
| Silicone Rubber (e.g., silanol functional fluid) | Andisil ® OH750 (silanol terminated, viscosity = 750 cps.) | 20-50 | 20-40 | 27-33 | 29.79 |
| Filler (e.g., fumed silica filler) | Aerosil ® R 972 (fumed silica aftertreated with dimethyldi-chlorosilane) | 0-10 | 1-5 | 1.5-2.5 | 1.99 |

-continued

| Material Type | Non-Limiting Example | First wt % Range | Second wt % Range | Third wt % Range | Example wt % |
|---|---|---|---|---|---|
| Filler (e.g., color and reinforcement filler) | $TiO_2$ | 0-15 | 4-10 | 6-8 | 6.95 |
| Filler (e.g., tensile enhancing) filler | Minex ® 3 (a micronized functional filler and/or extender produced from nepheline syenite; a naturally occurring, silica deficient, sodium-potassium alumina silicate) | 0-10 | 1-5 | 2.5-3.5 | 2.98 |
| Cross-linking Agent | MOS (methyltris (methylethyl-ketoxime) silane) | 0-10 | 1-5 | 3-4 | 3.48 |
| Cross-linking Agent | VOS (vinyl tris (methylethyl-ketoxime) silane) | 0-10 | 0.5-2.5 | 1.25-1.75 | 1.49 |
| Adhesion Promoter | Dynasylan ® 1122 (bis(3-triethoxysilyl (propyl) amine)) | 0-1.5 | 0.2-1.0 | 0.5-0.7 | 0.60 |

-continued

| Material Type | Non-Limiting Example | First wt % Range | Second wt % Range | Third wt % Range | Example wt % |
|---|---|---|---|---|---|
| Hydrophobic Fumed Silica | HDK ® H2000 (synthetic, hydrophobic, amorphous silica, produced via flame hydrolysis) | 0-10 | 1-7 | 3-5 | 3.97 |
| Siloxane fluid (e.g., cyclomethicone fluid) | Decamethyl-cyclo-pentasiloxane | 10-30 | 15-27 | 18-24 | 20.85 |
| Propellant | Propane/ Butane mix | 20-40 | 23-33 | 25-31 | 27.81 |
| Catalyst | Andisil ® TL 28 (dimethyltin dineodecanoate) | 0.001-1.0 | 0.01-0.50 | 0.05-0.20 | 0.10 |

Decamethylcyclopentasiloxane, also known as D5, is an organosilicon compound with the formula $[(CH_3)_2SiO]_5$. It is a colorless and odorless liquid that is slightly volatile. D5 is considered an emollient, and is also considered a compatibilizer for the silicone/aerosol mix.

The inclusion of D5 may reduce mud cracking, enhance film development, and improve one or more physical properties). D5 is not a volatile organic compound (VOC). Its use may impart greater resistance to graffiti, thereby making surfaces easier to clean.

The Table below summarizes a fourth type of aerosol silicone composition in accordance with some embodiments of the present disclosure. The composition is clear or transparent.

| Material Type | Non-Limiting Example | First wt % Range | Second wt % Range | Third wt % Range | Example wt % |
|---|---|---|---|---|---|
| Silicone Rubber (e.g., silanol functional fluid) | Andisil ® OH750 (silanol terminated, viscosity = 750 cps.) | 40-70 | 46-66 | 50-62 | 55.75 |
| Filler (e.g., fumed silica filler) | Aerosil ® R 300 (fumed silica with a specific surface area of about 300 $m^2/g$) | 0-10 | 1-5 | 2.75-3.75 | 3.25 |
| Crosslinking Agent | MOS (methyltris (methylethylketoxime) silane) | 0-10 | 4-8 | 5-7 | 6.00 |
| Crosslinking Agent | VOS (vinyl tris (methylethylketoxime) silane) | 0-10 | 1-5 | 2-3 | 2.65 |
| Adhesion Promoter | Dynasylan ® 1122 (bis(3-triethoxysilyl (propyl) amine)) | 0-2 | 0.1-0.5 | 0.2-0.3 | 0.25 |
| Siloxane fluid (e.g., cyclomethicone fluid) | Decamethylcyclo-pentasiloxane | 22-42 | 26-38 | 29-35 | 32.00 |
| Catalyst | Andisil ® TL 28 (dimethyltin dineodecanoate) | 0.001-1.0 | 0.01-0.50 | 0.05-0.20 | 0.10 |

The Table below summarizes a fifth type of aerosol silicone composition in accordance with some embodiments of the present disclosure. The composition is white. However, other colors may be produced by varying the fillers, pigments, or other components.

| Material Type | Non-Limiting Example | First wt % Range | Second wt % Range | Third wt % Range | Example wt % |
|---|---|---|---|---|---|
| Silicone Rubber (e.g., silanol functional fluid) | Andisil ® OH750 (silanol terminated, viscosity = 750 cps.) | 25-55 | 30-50 | 35-45 | 40.000 |
| Filler (e.g., fumed silica filler) | Aerosil ® R 972 (fumed silica aftertreated with dimethyldichlorosilane) | 0-10 | 2-6 | 3.5-4.5 | 4.000 |
| Pigment/Filler (e.g., color and reinforcement filler) | $TiO_2$ | 0.1-15 | 2-10 | 5-7 | 6.200 |
| Filler (e.g., tensile enhancing filler) | Minex ® 3 (a micronized functional filler and/or extender produced from nepheline syenite; a naturally occurring, silica deficient, sodium-potassium alumina silicate) | 0-20 | 8-16 | 10-14 | 12.000 |
| Crosslinking Agent | MOS (methyltris (methylethylketoxime) silane) | 0-10 | 2.5-6.5 | 3.5-5.5 | 4.600 |
| Crosslinking Agent | VOS (vinyl tris (methylethylketoxime) silane) | 0-10 | 1-3 | 1.5-2.5 | 2.000 |
| Adhesion Promoter | Dynasylan ® 1122 (bis(3-triethoxysilyl (propyl) amine)) | 0-3 | 0.5-1.5 | 0.75-1.25 | 1.000 |
| Siloxane fluid (e.g., cyclomethicone fluid) | Decamethylcyclopentasiloxane | 20-40 | 24-36 | 27-33 | 30.120 |
| Catalyst | Andisil ® TL 28 (dimethyltin dineodecanoate) | 0.001-1.0 | 0.01-0.50 | 0.04-0.10 | 0.075 |

The Table below summarizes a sixth type of aerosol silicone composition in accordance with some embodiments of the present disclosure. The composition is black. However, other colors may be produced by varying the fillers, pigments, or other components.

| Material Type | Non-Limiting Example | First wt % Range | Second wt % Range | Third wt % Range | Example wt % |
|---|---|---|---|---|---|
| Silicone Rubber (e.g., silanol functional fluid) | Andisil ® OH750 (silanol terminated, viscosity = 750 cps.) | 25-55 | 30-50 | 35-45 | 40.00 |
| Filler (e.g., fumed silica filler) | Aerosil ® R 972 (fumed silica aftertreated with dimethyldichlorosilane) | 0-10 | 1.5-5.5 | 3-4 | 3.60 |
| Pigment | Black tint | 0.1-10 | 0.5-5 | 1-3 | 2.00 |
| Filler (e.g., tensile enhancing filler) | Minex ® 3 (a micronized functional filler and/or extender produced from nepheline syenite; a naturally occurring, silica deficient, sodium-potassium alumina silicate) | 0-25 | 5-20 | 10-18 | 16.20 |
| Crosslinking Agent | MOS (methyltris (methylethylketoxime) silane) | 0-10 | 2.5-6.5 | 3.5-5.5 | 4.60 |
| Crosslinking Agent | VOS (vinyl tris (methylethylketoxime) silane) | 0-10 | 1-3 | 1.5-2.5 | 2.00 |
| Adhesion Promoter | Dynasylan ® 1122 (bis(3-triethoxysilyl (propyl) amine)) | 0-3 | 0.5-1.5 | 0.75-1.25 | 1.00 |
| Siloxane fluid (e.g., cyclomethicone fluid) | Decamethylcyclopentasiloxane | 20-40 | 24-36 | 27-33 | 30.45 |

-continued

| Material Type | Non-Limiting Example | First wt % Range | Second wt % Range | Third wt % Range | Example wt % |
|---|---|---|---|---|---|
| Catalyst | Andisil ® TL 28 (dimethyltin dineodecanoate) | 0.001-1.0 | 0.01-0.50 | 0.10-0.20 | 0.125 |

The Tables for the fourth through sixth compositions list the relative amounts of components prior to the addition of the propellant(s). The compositions prior to the addition of the propellant(s) may be referred to as "silicone blends". The propellant(s) may be added in a total amount of from about 10 wt % to about 50 wt % of the total weight of the propellant(s) and the silicone blend. In some embodiments, the relative amount of propellant(s) is in the range of from about 15 wt % to about 45 wt %, including from about 20 wt % to about 40 wt %, from about 25 wt % to about 35 wt %, from about 29 wt % to about 33 wt %, from about 30 wt % to about 32 wt %, and about 31 wt %.

The propellant may be a mixture of propane and butane. In some embodiments, the propellant is a mixture of propane (CAS No. 74-98-6) and n-butane (CAS No. 106-97-8). The mixture may contain from about 10 wt % to about 90 wt % propane, including from about 15 wt % to about 50 wt % propane, from about 20 wt % to about 30 wt % propane, from about 23 wt % to about 29 wt % propane, and about 26 wt % propane. The mixture may contain from about 10 wt % to about 90 wt % butane, including from about 50 wt % to about 90 wt % butane, from about 65 wt % to about 85 wt % butane, from about 70 wt % to about 78 wt % butane, from about 72 wt % to about 76 wt % butane, and about 74 wt % butane.

In some embodiments, an inert gas (e.g., nitrogen) is added to the container. The inert gas may be injected through a valve (e.g., after can crimping). The inert gas may be added to the silicone blend prior to the introduction of the propellant. In particular embodiments, the inert gas is added to the container if the container is not going to be filled/gassed with the propellant right away.

FIG. 1 illustrates a first non-limiting method 100 of producing an aerosol silicone product in accordance with some embodiments of the present disclosure. The method 100 includes forming a silicone elastomer composition 110; providing the silicone elastomer composition to a container 120; closing the container 130; providing a propellant to the container via a valve 140; and mixing the contents 150. In some embodiments, the valve is included in a closure applied during the closing 130.

Figure 2:
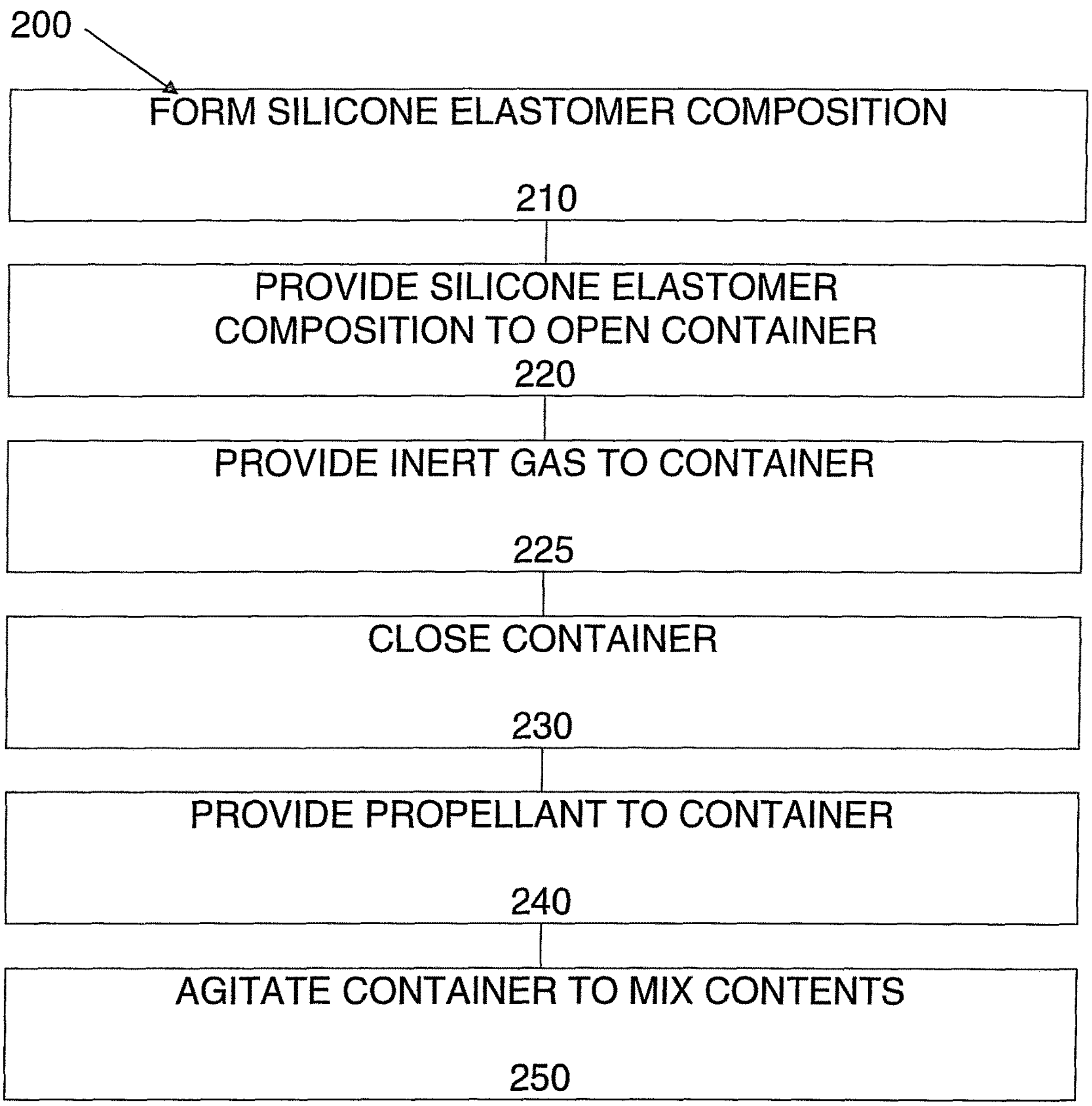
FIG. 2 is a flow chart illustrating a non-limiting example of another method for producing an aerosol silicone product in accordance with some embodiments of the present disclosure.

FIG. 2 illustrates a second non-limiting method 200 of producing an aerosol silicone product in accordance with some embodiments of the present disclosure. The method 200 includes forming a silicone elastomer composition 210; providing the silicone elastomer composition to a container 220; providing an inert gas to the container 225; closing the container 230; providing a propellant to the container via a valve 240; and mixing the contents 250. The inert gas may be provided 225 before or after closing the container 230. The inert gas may be provided 225 via the valve.

Figure 3:
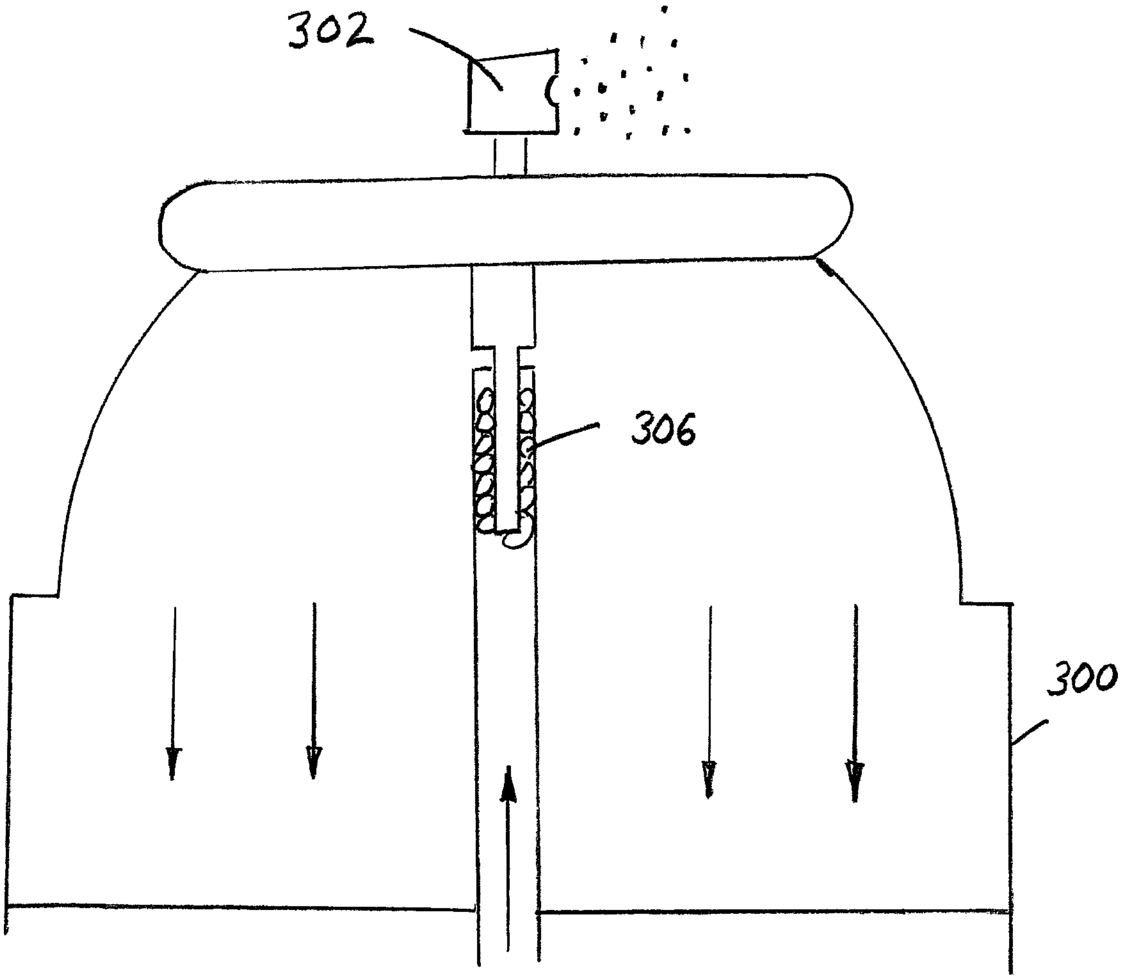
FIG. 3 shows details of a known aerosol spray container.

FIG. 3 shows a portion of a known aerosol spray container 300 that receives the silicone elastomer composition described above. More specifically, known aerosol valve technology uses an actuator/spray nozzle 302 which, when depressed, opens a spring-loaded valve 304 allowing a liquid (e.g. paint) material to exit the pressurized container or can 300 through the actuator/spray nozzle. The valve 304 returns to a closed position when the actuator/spray nozle 302 is released due to the returning force imposed by a spring 306. This system is effective with certain products such as paint systems that are low solids (less than 35% by weight) and where the product cures by evaporation of the volatiles in the system. After actuating the valve 304 and spraying the paint through the actuator/spray nozzle 302, and before long term storage of the partially empty container, the container 300 is preferably turned upside down and the actuator/spray nozzle depressed to allow gas propellant to evacuate or clean the actuator/spray nozzle and the valve assembly 304 of residual liquid paint. This prevents the residual paint from curing and causing the valve 304 and/or actuator/spray nozzle 302 to stick in future applications. A seal or gasket 310 that a plunger 312 of the valve 304 rests against prevents propellant and paint from inadvertently escaping the container 300, and since the solvents in the paint cannot evaporate, provides for long term storage of partially empty containers by evacuating the valve and actuator/spray nozzle 302 after use.

Room temperature vulcanized (RTV) silicone coatings such as described above are moisture cure. The current design for sealing aerosol spray containers is not particularly effective with RTV silicone coatings. Particularly, the RTV silicones cure by reacting with moisture vapor which is always present in the atmosphere. To prevent unwanted cure of the silicone, the product stored in the container must be more effectively protected by a vapor barrier container and valve assembly. While the valve actuator/spray nozzle assembly of FIGS. 3-5 could be modified to be formed from products that are moisture vapor resistant (metals, plastics, rubbers) and thus this provides one potential solution for dispensing the silicone elastomer composition of the present disclosure, it is believed that the relatively low pressure (less than 100 psi) being exerted on the valve plunger and holding it closed is insufficient to prevent moisture vapor from reaching the latent residual silicone material present even after following the evacuation step described above of inverting the container. Experience has shown that the valve assembly will ultimately stick and become nonfunctioning in a short timeframe after terminating spray application—again even after following the evacuation step described above of inverting the container. The latent or residual silicone cures and binds the valve plunger/seal together.

FIGS. 4-7 show a modified assembly for effectively and selectively preventing moisture vapor from interacting with the silicone-based elastomer aerosol product stored in the container. For ease of illustration and discussion, in FIGS. 4-7 like reference numerals in the "400" series will refer to like components shown in FIGS. 3-5. The valve plunger 412 and seal 410 rest against the underside of the actuator collar 414. This collar 414 provides a round, tube like channel for the actuator stem 416 to slide through. The collar 414 is made from metal (which is a totally moisture vapor resistant product). The actuator/spray nozzle 402 is easily removed from the collar 414 by pulling it upward by hand. The following process after spraying silicone allows the container 400 to be stored without any curing of the silicone within the valve assembly. First, the container 400 is inverted, and the silicone is evacuated from the valve 404 and actuator/spray nozzle 402 by spraying propellant. The actuator/spray nozzle 402 is subsequently removed from the collar 414. Next, a plug 420 is inserted into the collar 414 where the actuator/spray nozzle was previously received.

Figure 4:
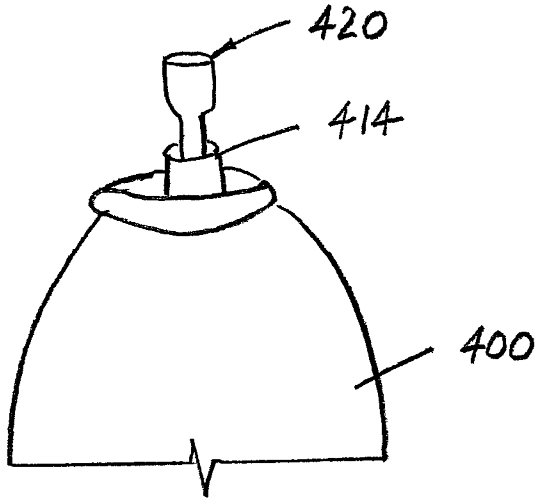
FIGS. 4-7 show a solution to preventing intrusion of moisture vapor into an aerosol spray container.
Figure 5:
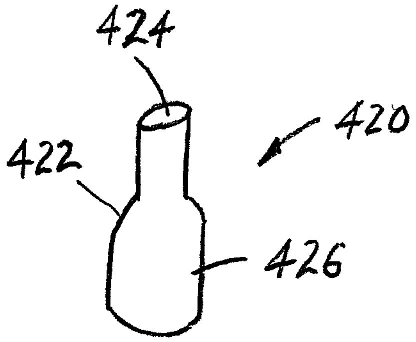
Figure 7:
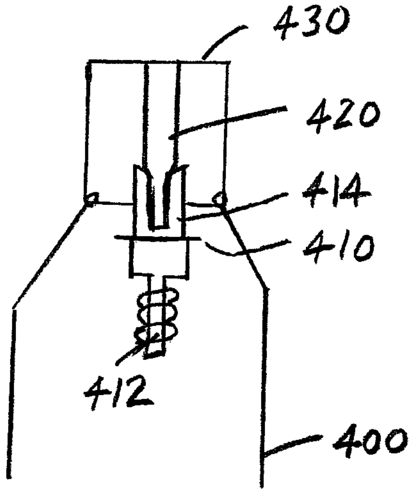
Figure 6:
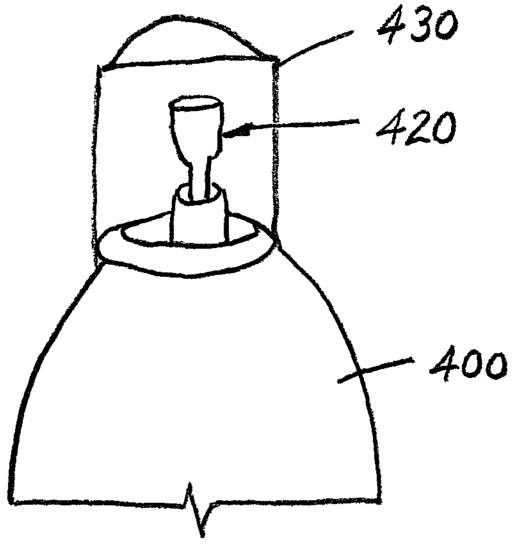

The plug 420 can be made of any moisture resistant material (metal, plastic, rubber, etc.). To spray after storage, the plug 420 is simply removed from the collar 414 of the container 400, the plug and insert the actuator/spray nozzle 402. A preferred design of the plug 420 has a shoulder 422 (such as a tapered shoulder) between a small diameter portion 424 and a large diameter portion 426 that prevents the plug from contacting the valve plunger 412 and helps seal moisture as a result of the enlarged diameter portion of the plug contacting the top of the collar 414. The large diameter portion 426 of the plug 420 should be slightly larger than the inside diameter of the collar 414 to insure a tight seal while the small diameter portion 424 fits snugly in the collar. The plug 420 can be a stand-alone piece as shown in FIGS. 4-5. Alternatively, the preferred design would have the plug 420 incorporated into a modified plastic cap 430 where the cap is used to cover the actuator/spray nozzle 402 on the aerosol container 400.

This written description uses examples to describe the disclosure, including the best mode, and also to enable any person skilled in the art to make and use the disclosure. Other examples that occur to those skilled in the art are intended to be within the scope of the present disclosure if they have structural elements that do not differ from the same concept, or if they include equivalent structural elements with insubstantial differences. It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A silicone-based aerosol product comprising:

a container; and an aerosol silicone composition within the container;

wherein the aerosol silicone composition comprises a silicone elastomer composition and a propellant; and wherein the silicone elastomer composition comprises:

a silanol functional fluid;

a siloxane fluid;

a catalyst;

3.5 wt % to 7 wt % of methyltris(methylethylketoxime) silane; and 1.5 wt % to 3 wt % of vinyl tris(methylethylketoxime) silane.

2. The product of claim 1, wherein the silicone elastomer composition comprises:

25 wt % to 70 wt % of the silanol functional fluid;

20 wt % to 42 wt % of the siloxane fluid;

0.001 wt % to 1 wt % of the catalyst;

up to 45 wt % of at least one filler;

3.5 wt % to 7 wt % of the methyltris(methylethylketoxime) silane; and 1.5 wt % to 3 wt % of the vinyl tris(methylethylketoxime) silane; and up to 3 wt % of an adhesion promoter.

3. The product of claim 2, wherein the silicone elastomer composition comprises:

50 wt % to 62 wt % of the silanol functional fluid;

29 wt % to 35 wt % of the siloxane fluid, wherein the siloxane fluid is decamethylcyclopentasiloxane;

0.05 wt % to 0.20 wt % of the catalyst, wherein the catalyst is dimethyltin dineodecanoate;

2.75 wt % to 3.25 wt % of the at least one filler, wherein the at least one filler is fumed silica;

5 wt % to 7 wt % of the methyltris(methylethylketoxime) silane;

2 wt % to 3 wt % of the vinyl tris(methylethylketoxime) silane; and 0.2 wt % to 0.3 wt % of the adhesion promoter, wherein the adhesion promoter is bis(3-triethoxysilylpropyl) amine.

4. The product of claim 2, wherein the at least one filler is a mixture of fumed silica, a pigment filler, and a nepheline syenite-derived filler; and wherein the silicone elastomer composition comprises:

35 wt % to 45 wt % of the silanol functional fluid;

27 wt % to 33 wt % of the siloxane fluid, wherein the siloxane fluid is decamethylcyclopentasiloxane;

0.04 wt % to 0.10 wt % of the catalyst, wherein the catalyst is dimethyltin dineodecanoate;

3.5 wt % to 4.5 wt % of the fumed silica;

5 wt % to 7 wt % of the pigment filler;

10 wt % to and 14 wt % of the nepheline syenite-derived filler;

3.5 wt % to 5.5 wt % of the methyltris(methylethylketoxime) silane;

1.5 wt % to 2.5 wt % of the vinyl tris(methylethylketoxime) silane; and 0.75 wt % to 1.25 wt % of the adhesion promoter, wherein the adhesion promoter is bis(3-triethoxysilylpropyl) amine.

5. The product of claim 4, wherein the pigment filler is titanium dioxide.

6. The product of claim 2, wherein the at least one filler is a mixture of fumed silica, a pigment filler, and a nepheline syenite-derived filler; and wherein the silicone elastomer composition comprises:

35 wt % to 45 wt % of the silanol functional fluid;

27 wt % to 33 wt % of the siloxane fluid, wherein the siloxane fluid is decamethylcyclopentasiloxane;

0.10 wt % to 0.20 wt % of the catalyst, wherein the catalyst is dimethyltin dineodecanoate;

3 wt % to 4 wt % of the fumed silica;

1 wt % to 3 wt % of the pigment filler;

10 wt % to 18 wt % of the nepheline syenite-derived filler;

3.5 wt % to 5.5 wt % of the methyltris(methylethylketoxime) silane;

1.5 wt % to 2.5 wt % of the vinyl tris(methylethylketoxime) silane; and 0.75 wt % to 1.25 wt % of the adhesion promoter, wherein the adhesion promoter is bis(3-triethoxysilylpropyl) amine.

7. The product of claim 6, wherein the pigment filler is a black pigment filler.

8. The product of claim 1, wherein the aerosol silicone composition further comprises an inert gas.

9. The product of claim 1, wherein the propellant comprises a mixture of propane and butane.

10. The product of claim 9, wherein the mixture comprises from about 23 wt % to about 29 wt % propane and from about 72 wt % to about 76 wt % butane.

11. An aerosol silicone composition comprising:
a propellant; and
a silicone elastomer composition, the silicone elastomer composition comprising:
25 wt % to 70 wt % of a silanol functional fluid;
20 wt % to 42 wt % of a siloxane fluid;
0.001 wt % to 1 wt % of a catalyst;
up to 45 wt % of at least one filler;
3.5 wt % to 7 wt % of methyltris(methylethylketoxime) silane;
1.5 wt % to 3 wt % of vinyl tris(methylethylketoxime) silane; and
up to 3 wt % of an adhesion promoter.

12. The composition of claim 11, further comprising:
an inert gas.

13. The composition of claim 11, wherein the silicone elastomer composition comprises:
50 wt % to 62 wt % of the silanol functional fluid;
29 wt % to 35 wt % of the siloxane fluid, wherein the siloxane fluid is decamethylcyclopentasiloxane;
0.05 wt % to 0.20 wt % of the catalyst, wherein the catalyst is dimethyltin dineodecanoate;
2.75 wt % to 3.25 wt % of the at least one filler, wherein the at least one filler is fumed silica;
5 wt % to 7 wt % of the methyltris(methylethylketoxime) silane;
2 wt % to 3 wt % of the vinyl tris(methylethylketoxime) silane; and
0.2 wt % to 0.3 wt % of the adhesion promoter, wherein the adhesion promoter is bis(3-triethoxysilylpropyl) amine.

14. The composition of claim 11, wherein the at least one filler is a mixture of fumed silica, a pigment filler, and a nepheline syenite-derived filler; and wherein the silicone elastomer composition comprises:
35 wt % to 45 wt % of the silanol functional fluid;
27 wt % to 33 wt % of the siloxane fluid, wherein the siloxane fluid is decamethylcyclopentasiloxane;
0.04 wt % to 0.10 wt % of the catalyst, wherein the catalyst is dimethyltin dineodecanoate;
3.5 wt % to 4.5 wt % of the fumed silica;
5 wt % to 7 wt % of the pigment filler;
10 wt % to and 14 wt % of the nepheline syenite-derived filler;
3.5 wt % to 5.5 wt % of the methyltris(methylethylketoxime) silane;
1.5 wt % to 2.5 wt % of the vinyl tris(methylethylketoxime) silane; and
0.75 wt % to 1.25 wt % of the adhesion promoter, wherein the adhesion promoter is bis(3-triethoxysilylpropyl) amine.

15. The composition of claim 14, wherein the pigment filler is titanium dioxide.

16. The composition of claim 11, wherein the at least one filler is a mixture of fumed silica, a pigment filler, and a nepheline syenite-derived filler; and wherein the silicone elastomer composition comprises:
35 wt % to 45 wt % of the silanol functional fluid;
27 wt % to 33 wt % of the siloxane fluid, wherein the siloxane fluid is decamethylcyclopentasiloxane;
0.10 wt % to 0.20 wt % of the catalyst, wherein the catalyst is dimethyltin dineodecanoate;
3 wt % to 4 wt % of the fumed silica;
1 wt % to 3 wt % of the pigment filler;
10 wt % to 18 wt % of the nepheline syenite-derived filler;
3.5 wt % to 5.5 wt % of the methyltris(methylethylketoxime) silane;
1.5 wt % to 2.5 wt % of the vinyl tris(methylethylketoxime) silane; and
0.75 wt % to 1.25 wt % of the adhesion promoter, wherein the adhesion promoter is bis(3-triethoxysilylpropyl) amine.

17. The composition of claim 16, wherein the pigment filler is a black pigment filler.

18. A silicone elastomer composition comprising:
a silanol functional fluid;
3.5 wt % to 7 wt % of methyltris(methylethylketoxime) silane;
1.5 wt % to 3 wt % of vinyl tris(methylethylketoxime) silane;
a catalyst; and
a siloxane fluid.

19. The silicone elastomer composition of claim 18, further comprising:
at least one filler; and
an adhesion promoter.

20. The silicone elastomer composition of claim 19 comprising:
25 wt % to 70 wt % of the silanol functional fluid;
up to 20 wt % of the at least one crosslinking agent;
0.001 wt % to 1 wt % of the catalyst;
20 wt % to 42 wt % of the siloxane fluid;
up to 45 wt % of the at least one filler;
3.5 wt % to 7 wt % of methyltris(methylethylketoxime) silane;
1.5 wt % to 3 wt % of vinyl tris(methylethylketoxime) silane; and
up to 3 wt % of the adhesion promoter.

21. A silicone-based aerosol product comprising:
a container; and
an aerosol silicone composition within the container;
wherein the aerosol silicone composition comprises a silicone elastomer composition and a propellant; and
wherein the silicone elastomer composition comprises:
a silanol functional fluid;
a siloxane fluid;
a catalyst;
at least one crosslinking agent; and
bis(3-triethoxysilylpropyl) amine.

22. The silicone-based aerosol product of claim 21, wherein the siloxane fluid comprises decamethylcyclopentasiloxane.

23. The silicone-based aerosol product of claim 21, wherein the silicone elastomer composition comprises:
25 wt % to 70 wt % of the silanol functional fluid;
20 wt % to 42 wt % of the siloxane fluid;
0.001 wt % to 1 wt % of the catalyst;
up to 45 wt % of at least one filler;
up to 20 wt % of at least one crosslinking agent; and
0.1 to 3 wt % of the bis(3-triethoxysilylpropyl) amine.

* * * * *